United States Patent
Kim et al.

(10) Patent No.: US 12,325,354 B2
(45) Date of Patent: Jun. 10, 2025

(54) ARMREST LIGHTING CONTROL DEVICE FOR VEHICLE

(71) Applicants: Hyundai Motor Company, Seoul (KR); Kia Corporation, Seoul (KR); Mobase Electronics co., ltd., Gyeonggi-do (KR); Hyundai Transys Inc., Seosan-Si (KR)

(72) Inventors: Ji-Hwan Kim, Seoul (KR); Tae-Hoon Lee, Suwon (KR); Byeong-Seon Son, Seoul (KR); Seon-Chae Na, Yongin (KR); Sang-Ho Kim, Incheon (KR); Sang-Hoon Park, Incheon (KR); Seong-Youn Jo, Seoul (KR); Yeong-Gil So, Anyang (KR)

(73) Assignees: Hyundai Motor Company, Seoul (KR); Kia Corporation, Seoul (KR); Mobase Electronics co., ltd., Gyeonggi-do (KR); Hyundai Transys Inc., Chungcheongnam-do (KR)

( * ) Notice: Subject to any disclaimer, the term of this patent is extended or adjusted under 35 U.S.C. 154(b) by 408 days.

(21) Appl. No.: 17/885,348

(22) Filed: Aug. 10, 2022

(65) Prior Publication Data
US 2023/0166651 A1 Jun. 1, 2023

(30) Foreign Application Priority Data
Nov. 30, 2021 (KR) .................. 10-2021-0168619

(51) Int. Cl.
*B60Q 1/26* (2006.01)
*B60Q 3/233* (2017.01)
(Continued)

(52) U.S. Cl.
CPC .......... *B60Q 1/2661* (2013.01); *B60Q 3/233* (2017.02); *B60Q 3/80* (2017.02); *H05B 47/115* (2020.01)

(58) Field of Classification Search
CPC ........ B60Q 1/2661; B60Q 3/233; B60Q 3/80; H05B 47/115; H05B 45/20; H05B 47/155;
(Continued)

(56) References Cited

U.S. PATENT DOCUMENTS

2019/0077313 A1* 3/2019 Kanaguchi ............ B60K 35/00

FOREIGN PATENT DOCUMENTS

JP 2018-069974 A 5/2018
KR 20-1998-0038939 U 9/1998
(Continued)

OTHER PUBLICATIONS

Translation of KR20190133923A (Year: 2019).*

*Primary Examiner* — Renan Luque
(74) *Attorney, Agent, or Firm* — Fox Rothschild LLP (57) ABSTRACT

In one aspect, an armrest lighting control device of a vehicle according to the present disclosure comprises a switch controller configured to produce a lighting color change effect or produce a fade-in/fade-out effect or an effect of turning off lighting by outputting a lighting-off signal from a lighting turning-off position of a switch lighting unit on the basis of a sensor signal from an acceleration sensor made by detecting a change in upward/downward armrest change angle of an armrest having the switch lighting unit directed toward a rear seat.

10 Claims, 5 Drawing Sheets

(51) Int. Cl.
*B60Q 3/80* (2017.01)
*H05B 47/115* (2020.01)

(58) Field of Classification Search
CPC .... H05B 47/105; B60K 35/00; B60R 16/005; B60R 16/02; B60Y 2400/304
See application file for complete search history.

(56) References Cited

FOREIGN PATENT DOCUMENTS

| | | | |
|---|---|---|---|
| KR | 10-1714718 B1 | 3/2017 | |
| KR | 10-2057222 B1 | 12/2019 | |
| KR | 20190133923 A * | 12/2019 | ............. B60N 2/767 |

* cited by examiner

ARMREST LIGHTING CONTROL DEVICE FOR VEHICLE

CROSS-REFERENCE TO RELATED APPLICATION

This application claims under 35 U.S.C. § 119(a) the benefit of Korean Patent Application No. 10-2021-0168619, filed on Nov. 30, 2021, the entire contents of which are incorporated herein by reference.

BACKGROUND OF THE DISCLOSURE

Technical Field of the Disclosure

The present disclosure relates to an armrest lighting device, and more particularly, to an armrest lighting control device capable of automatically switching from turned-on states of armrest side lights to turned-off states of the armrest side lights to prevent an occupant seated in a rear seat from being inconvenienced by emitted light when an armrest disposed at a rear seat of a vehicle is raised.

Background

In general, some high-grade vehicles, among vehicles, are equipped with a lighting device provided on a rear seat armrest disposed in a rear seat to provide light for an occupant seated in the rear seat. In this case, the rear seat armrest is also equipped with an air conditioning switch for operating a vehicle air conditioner, an audio remote control switch for operating a vehicle audio system, a heating wire switch for operating a seat heating wire, and a seat control switch for moving the rear seat forward or rearward.

For example, the armrest lighting device includes a mood lighting lamp. The mood lighting lamp includes a light source unit having a switch and an electric circuit, and a lamp lighting unit configured to emit light from the light source light. The mood lighting lamp illuminates a space around an occupant from a rear side by emitting light from a side of the armrest toward the rear seat.

However, because the armrest lighting device is always turned on at normal times, the lighting is kept turned on even though the armrest is moved from an opened position (i.e., a position at which the armrest is lowered) to a closed position (i.e., a position at which the armrest is raised).

Therefore, armrest side lights of the armrest lighting device continuously illuminate a headrest of the rear seat even though the occupant raises the armrest upward. For this reason, the occupant leaning against the rear seat feels discomfort, light blindness, and disturbance of relaxation because of light applied to the occupant's face when the occupant closes his/her eyes and takes a sleep.

SUMMARY OF THE DISCLOSURE

In one aspect, an armrest lighting control device for a vehicle is provided that preferably is capable of automatically switching from turned-on states of armrest side lights to turned-off states of the armrest side lights in order to prevent an occupant seated in a rear seat from being inconvenienced by light emitted from a side of an armrest when the armrest is raised. In particular, an aspect of the present disclosure is to provide an armrest lighting control device for a vehicle, which is capable of converting a change in armrest angle according to a 0° opened position and a 118° closed position of the armrest into coordinate values of an acceleration sensor, thereby implementing a switch lighting on/off operation, a fade-in/fade-out effect, a switch lighting color customizing effect, and interoperation logic between communication controllers.

As a preferred exemplary embodiment, the present disclosure provides an armrest lighting control device for a vehicle comprising: an armrest having a switch lighting unit and configured to define an armrest change angle in an upward/downward direction; an acceleration sensor mounted on the armrest and configured to generate a sensor signal indicating a change in armrest change angle; and a switch controller configured to recognize a lighting state change signal of the switch lighting unit on the basis of the sensor signal and output a lighting-off signal to the switch lighting unit.

In the exemplary embodiment, the switch lighting unit may comprise a lamp that is configured to turn on at user-defined normal times. As referred to herein, in one aspect, normal times for the lamp to be on may be between sundown and midnight, or when weather conditions produce darkness such as during storms. In another aspect, normal times may be between 5:00 pm and 11:30 pm, or between 6:00 pm and 11:00 pm, or between 7:00 pm and 10:30 pm, etc., depending on the location and weather conditions.

In the exemplary embodiment, the acceleration sensor may be configured to move together with the armrest between a fully-opened position and a fully-closed position, and the armrest change angle may be detected in a section between the fully-opened position and the fully-closed position on the basis of the sensor signal.

In the exemplary embodiment, the switch controller may be configured to output the lighting-off signal at an intermediate position between the fully-opened position and the fully-closed position recognized on the basis of the sensor signal, and the intermediate position may be a position of 60 to 70%, where the fully-opened position and the fully-closed position account for 100% and 0%, respectively.

In the exemplary embodiment, the switch controller may be configured to turn off lighting of the switch lighting unit on the basis of the lighting-off signal, and the switch controller may be configured to produce a fade-in/fade-out effect for lighting of the switch lighting unit on the basis of the lighting-off signal or produce a switch lighting color customizing effect using a lighting color change for lighting of the switch lighting unit on the basis of the lighting-off signal.

In the exemplary embodiment, the acceleration sensor may be connected to an interoperation controller, the interoperation controller may be configured to inform a driver of a change in state of the rear seat or the armrest on the basis of the sensor signal, and the change in state may be displayed on a driver seat cluster.

In the exemplary embodiment, the switch controller may be configured to apply information as to whether an armrest angle value of the armrest 5 is equal to or smaller than 20°±15° to an output of the lighting-on signal of the lighting singal.

The armrest lighting control device for a vehicle according to the present disclosure implements the following operations and effects.

First, the armrest side lights at the side of the rear seat are automatically switched on or off according to the movement of the position of the armrest, thereby providing the convenience in that the armrest side lights are automatically turned off in the closed state in which the armrest is raised upward. Second, since the armrest side lights are automatically turned off, it is possible to provide the effect of improving marketability while providing careful consideration to the occupant seated in the rear seat so that the occupant does not feel light blindness while taking a rest or sleep. Third, the turning-on state of the armrest side light is changed from the state in which the armrest side light is turned on at user-defined normal times to the state in which the armrest side light is turned on depending on conditions. Therefore, it is possible to implement the effect of reducing switch electric power consumption, thereby improving energy efficiency. Fourth, it is possible to implement the fade-in/fade-out effect that slowly brightens or darkens the lighting state when the position of the armrest moves. Fifth, it is possible to improve high-grade quality of the lighting interior using the rear seat armrest by changing the switch colors by the switch lighting color customizing effect according to the movement of the position of the armrest. Sixth, the information may be transmitted to all the controllers, which may perform communication (e.g., controller area network (CAN) communication), in addition to the lighting switch, thereby implementing entertainment systems and various types of interoperation logic of the vehicle according to the movement of the position of the armrest.

Other aspects are disclosed infra.

DETAILED DESCRIPTION

Hereinafter, exemplary embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 1:
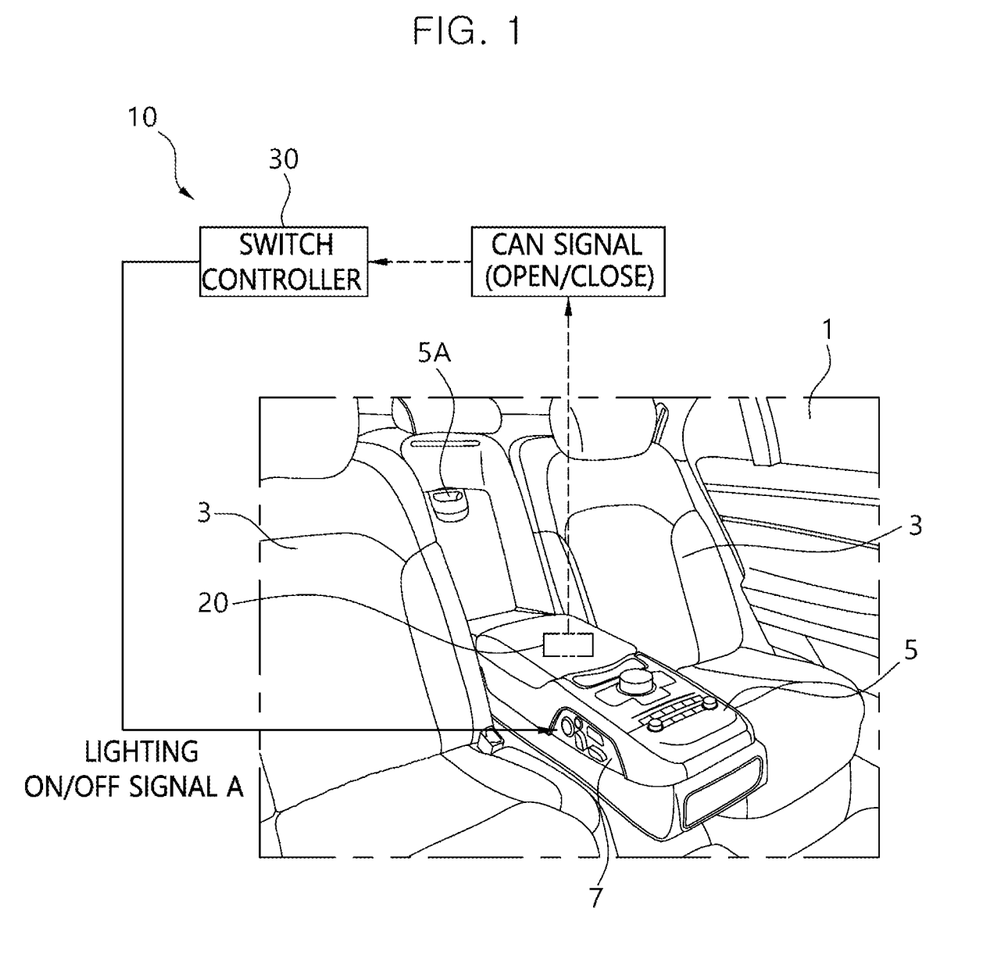
FIG. 1 is a configuration view illustrating an armrest lighting control device for a vehicle according to the present disclosure.

Referring to FIG. 1, an armrest 5 positioned between rear seats 3 of a vehicle 1 is connected to an armrest lighting control device 10. In this case, the armrest 5 is hingedly connected to a lower portion of an armrest holder 5A, such that an angle of the armrest 5 may be changed upward or downward with respect to the rear seat 3. Further, lighting signals A include a lighting-off signal and a lighting-on signal. A switch controller 30 applies information as to whether an armrest angle value of the armrest 5 is equal to or smaller than 20°±15° to output the lighting-on signal of the lighting signals A.

Figure 3:
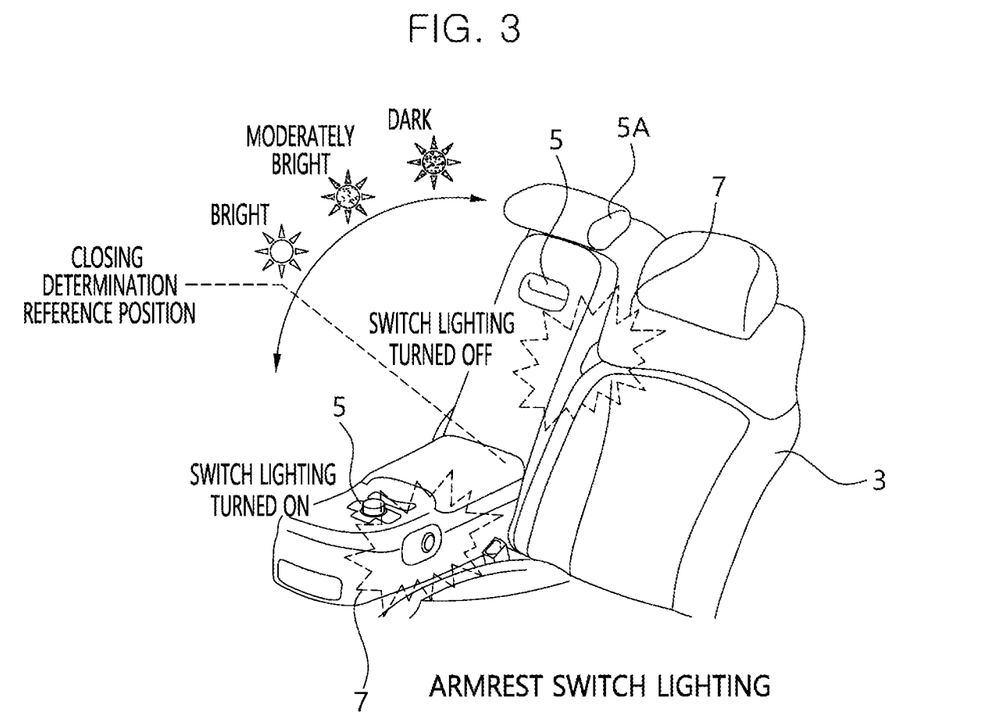
FIG. 3 is a view illustrating a state of armrest lighting which is turned on or off by a change in coordinate value of the acceleration sensor according to the present disclosure.

In particular, the armrest lighting control device 10 may output the lighting control signal through CAN communication depending on an opened position of the armrest 5 (i.e., a position at which the armrest 5 is lowered) and a closed position of the armrest 5 (a position at which the armrest 5 is raised), thereby basically providing an effect of automatically performing switching on/off on armrest side lights at a side of the rear seat 3 and an effect of gradually turning on or off a fade-in/fade-out effect (see FIG. 3).

Specifically, the armrest lighting control device 10 comprises a switch lighting unit 7, an acceleration sensor 20, and a switch controller 30.

For example, the switch lighting units 7 are positioned left and right sides of the armrest 5 positioned between the rear seats 3 disposed in two rows in a rear space of the vehicle 1. The switch lighting unit 7 illuminates a space around the rear seat 3 by transmitting, to the rear seat 3, light emitted from a light source (not illustrated) of a lamp module disposed in the armrest 5. In this case, the switch lighting unit 7 comprises a lamp that is turned on at user-defined normal times.

Therefore, the switch lighting unit 7 is identical to a switch lighting lamp module in the related art. However, the switch lighting unit 7 is different from the switch lighting lamp module in the related art in that an electric circuit of an on/off switch is connected to the switch controller 30 and turned on or off on the basis of the lighting on/off signal A outputted from the switch controller 30. In this case, the lighting off signal A of the lighting on/off signals A means a lighting state change signal that implements the fade-in/fade-out effect and the lighting color change in addition to an effect of turning off the lighting of the switch lighting unit 7.

For example, the acceleration sensor 20 is mounted in an internal space of the armrest 5 by means of an armrest component or an internal space of the switch lighting unit 7. The acceleration sensor 20 converts an acceleration value of the armrest 5, which is generated while the armrest 5 is raised upward toward the armrest holder 5A, into a coordinate value and then outputs a status signal (e.g., an open/close signal) to the switch controller 30 through the CAN of the vehicle 1. In this case, a MEMS (micro-electromechanical systems) type DOMS (digital output motion sensor) may be applied as the acceleration sensor 20.

For example, the switch controller 30 recognizes an output signal from the acceleration sensor 20 through the CAN communication and outputs the lighting on/off signal A on the basis of the recognized status signal (e.g., the open/close signal), thereby automatically switching the lighting state of the switch lighting unit 7 from a turned-on state to a turned-off state or from the turned-off state to the turned-on state.

Therefore, the switch controller 30 may be a switch controller in the related art applied to the switch lighting unit 7, but the switch controller 30 is different from the switch controller in the related art in that the acceleration sensor 20 and the communication circuit are provided by means of the CAN, particularly, electronic element components or the like are included to constitute a sensor signal processing unit and a control signal output unit.

Figure 2:
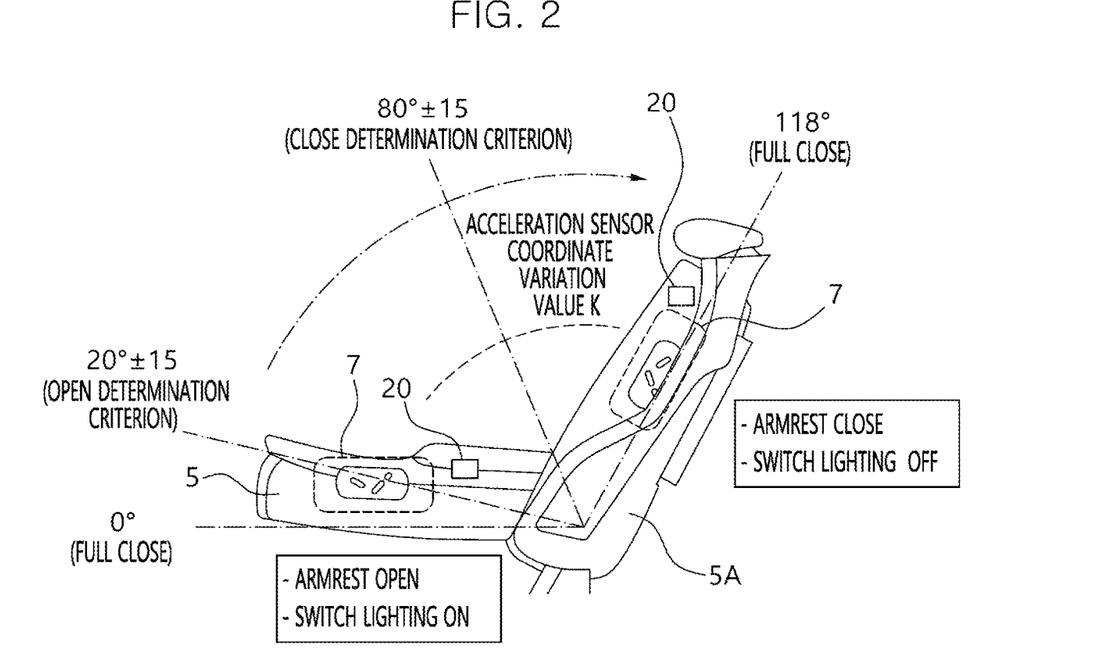
FIG. 2 is a view illustrating an operating state of an acceleration sensor configured to operate in conjunction with a movement of an armrest according to the present disclosure.

Meanwhile, FIGS. 2 and 3 illustrates an effect of automatically turning on or off the switch and the fade-in/fade-out effect which are implemented by the armrest lighting control device 10.

Referring to FIG. 2, the armrest 5 defines an armrest change angle between a fully-opened position of 0° at which the armrest 5 is fully lowered downward and a fully-closed position of 120° at which the armrest 5 is fully raised upward toward the armrest holder 5A. The fully-closed position of 120° is within a range of about 110° to 130°, but the fully-closed position of about 118° will be described.

Therefore, the acceleration sensor 20 produces an acceleration sensor coordinate variation value K in respect to an angle section of 0 to 118° while moving together with the armrest 5, and the acceleration sensor coordinate variation value K is transmitted to the switch controller 30 through the CAN.

Then, the switch controller 30 recognizes a movement of the position of the switch lighting unit 7 on the basis of a section coordinate value that varies in 0 to 118° by using a 0° coordinate value of the acceleration sensor coordinate variation value K as an armrest position determination criterion. The switch controller 30 recognizes a state in which the switch lighting unit 7 is raised toward the headrest of the rear seat 3 on the basis of a 118° coordinate value.

In particular, the switch controller 30 uses a position (e.g., 80°±15°) of about 60 to 70% of the section of 0 to 118° as a switch lighting switching criterion and outputs, to the electric circuit of the switch lighting unit 7, the lighting on/off signal A (see FIG. 1) that maintains the lighting state of the switch lighting unit 7 before the switch lighting switching criterion is reached and turns off the lighting state of the switch lighting unit 7 after the switch lighting switching criterion is reached.

Therefore, the switch controller 30 automatically switches the lighting on signal A maintained to 0 to 80° of the armrest 5 and maintains the lighting off signal A to 80 to 118°, such that the operation of automatically turning on or off the switch is performed at the position (e.g., 80°±15°) of about 60 to 70% of the section of 0 to 118°.

Therefore, even though the occupant raises the armrest 5 upward, the switch lighting unit 7 of the armrest lighting control device 10 does not produce light blindness that hinders the relaxation of the occupant seated in the rear seat.

FIG. 3 illustrates the fade-in/fade-out effect implemented by the switch controller 30. In this case, the fade-in/fade-out effect means that lighting brightness of the switch lighting unit 7 gradually changes from a bright state to a dark state or from the dark state to the bright state.

To this end, the switch controller 30 produces the fade-out effect by completely blocking electric current on the basis of the lighting off signal A at the fully-closed position of 118° while slowly reducing intensity of electric current of the switch lighting unit 7 on the basis of the lighting off signal A at a switch lighting turning reference position from the position (e.g., 80°±15°) of about 60 to 70% of the section of 0 to 118°. In contrast, the switch controller 30 produces the fade-in effect by slowly raising intensity of electric current of the switch lighting unit 7 from the fully-closed position of 118° to the position (e.g., 80°±15°) of about 60 to 70% of the section of 0 to 118° on the basis of the lighting off signal A.

In particular, the switch controller 30 produces the fade-in/fade-out effect for about 1 second at the switch lighting turning reference position from the position (e.g., 80°±15°) of about 60 to 70% of the section of 0 to 118°.

Figure 4:
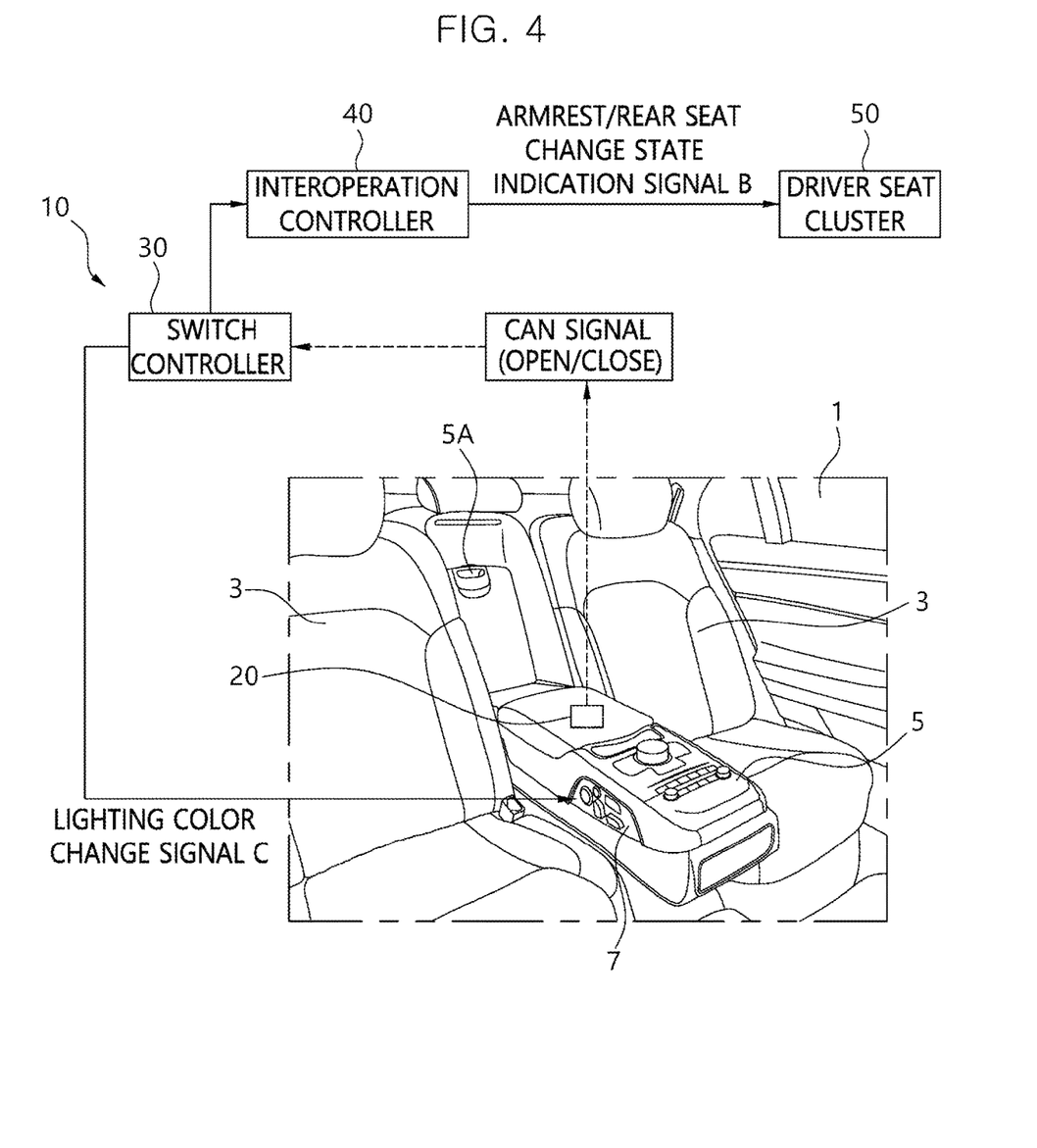
FIG. 4 is a view illustrating an example in which the armrest lighting control device according to the present disclosure is connected to other interoperation controllers of a vehicle.
Figure 5:
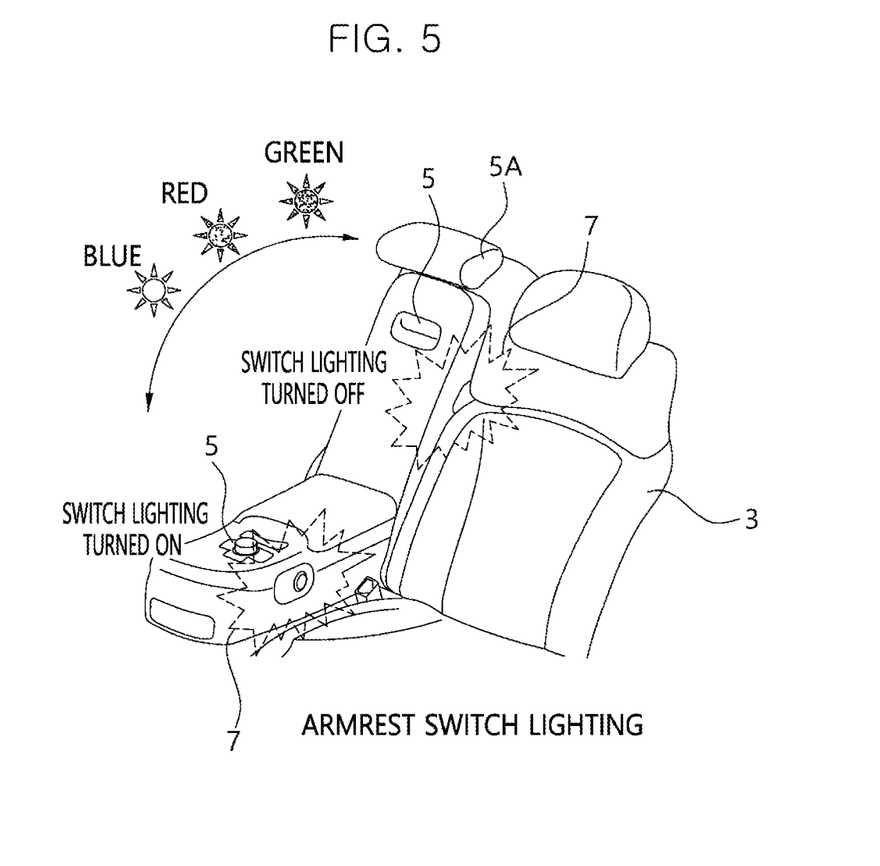
FIG. 5 is a view illustrating a state in which the armrest lighting control device according to the present disclosure changes armrest lighting colors.

Meanwhile, FIGS. 4 and 5 illustrate various modified examples of the armrest lighting control device 10.

Referring to FIG. 4, the armrest lighting control device 10 may comprise an interoperation controller 40 configured to perform the CAN communication with the switch controller 30 configured to control the switch lighting unit 7 on the basis of the signal from the acceleration sensor 20. In this case, the interoperation controller 40 is a kind of vehicle-mounted controller configured to control various devices of the vehicle 1.

For example, the interoperation controller 40 recognizes the open/close signal from the acceleration sensor 20, which is checked on the basis of a CAN signal, while operating in conjunction with the switch controller 30 or recognizes the open/close signal received directly from the acceleration sensor 20. The interoperation controller 40 is configured to output an armrest/rear seat change state display signal B to a driver seat cluster 50 to enable the driver to recognize, from the driver seat cluster 50, the state in which the armrest 5 or the rear seat 3 is changed.

In particular, the interoperation controller 40 of the armrest lighting control device 10 recognizes the current armrest angle according to the armrest angle and transmits the corresponding information to the switch controller 30 so that interoperation logic may be performed. Further, the interoperation controller 40 may transmit information to all the controllers, which may perform communication, in addition to the switch, and the interoperation controller 40 may implement various types of interoperation logic.

Referring to FIG. 5, among the positions of the armrest 5, the switch controller 30 sets the fully-opened position of 0° to a lighting turning-on state by the lighting turning-on of the switch lighting unit 7 and sets the fully-closed position of 118° to a lighting turning-off state by the lighting turning-off of the switch lighting unit 7. Further, the switch controller 30 outputs a lighting color change signal C to the switch lighting unit 7 in the section of 0 to 118° in which the armrest 5 moves, thereby implementing a lighting color change effect of changing lighting colors of the switch lighting unit 7 to blue, red, and green colors.

As described above, the armrest lighting control device 10 of the vehicle 1 according to the present exemplary embodiment comprises the switch controller 30 configured to produce the lighting color change effect or produce the fade-in/fade-out effect or the effect of turning off the lighting by outputting the lighting-off signal A from the lighting turning-off position of the switch lighting unit 7 on the basis of the sensor signal from the acceleration sensor 20 made by detecting the change in upward/downward armrest change angle of the armrest 5 having the switch lighting unit 7 directed toward the rear seat 3. Therefore, it is possible to eliminate discomfort caused by lighting light and felt by the occupant seated in the rear seat when the armrest 5 is raised. In particular, it is possible to implement the fade-in/fade-out effect and the switch lighting color customizing effect of the switch lighting on the basis of the coordinate value conversion value of the acceleration sensor 20 produced between the opened position and the closed position of the armrest 5.

What is claimed is:

1. An armrest lighting control device comprising:
   an armrest having a switch lighting unit and configured to define an armrest change angle in an upward/downward direction;
   an acceleration sensor mounted on the armrest and configured to generate a sensor signal indicating a change in armrest change angle; and
   a switch controller configured to recognize a lighting state change signal of the switch lighting unit on the basis of the sensor signal, and output a lighting-off signal to the switch lighting unit,
   wherein the acceleration sensor is configured to move together with the armrest between a fully-opened position and a fully-closed position, and the armrest change angle is detected in a section between the fully-opened position and the fully-closed position on the basis of the sensor signal, and
   wherein the switch controller is configured to output the lighting-off signal at an intermediate position between the fully-opened position and the fully-closed position recognized on the basis of the sensor signal.

2. The armrest lighting control device of claim 1, wherein the armrest is positioned between rear seats, and the switch lighting unit is configured to emit light toward the rear seats.

3. The armrest lighting control device of claim 1, wherein the switch lighting unit comprises a lamp that is configured to turn on at user-defined normal times.

4. The armrest lighting control device of claim 1, wherein the intermediate position is a position of 60 to 70%, where the fully-opened position and the fully-closed position account for 100% and 0% respectively.

5. The armrest lighting control device of claim 1, wherein the switch controller is configured to turn off lighting of the switch lighting unit on the basis of the lighting-off signal.

6. An armrest lighting control device comprising,
   an armrest having a switch lighting unit and configured to define an armrest change angle in an upward/downward direction,
   an acceleration sensor mounted on the armrest and configured to generate a sensor signal indication a change in armrest change angle, and
   a switch controller configured to recognize a lighting state change signal of the switch lighting unit on the basis of the sensor signal, and output a lighting-off signal to the switch lighting unit;
   wherein the switch controller is configured to produce a fade-in/fade-out effect for lighting of the switch lighting unit on the basis of the lighting-off signal.

7. The armrest lighting control device of claim 6, wherein the switch controller is further configured to produce a switch lighting color customizing effect using a lighting color change for lighting of the switch lighting unit on the basis of the lighting-off signal.

8. An armrest lighting control device comprising:
   an armrest having a switch lighting unit and configured to define an armrest change angle in an upward/downward direction,
   an acceleration sensor mounted on the armrest and configured to generate a sensor signal indication a change in armrest change angle, and
   a switch controller configured to recognize a lighting state change signal of the switch lighting unit on the basis of the sensor signal, and output a lighting-off signal to the switch lighting unit,
   wherein the acceleration sensor is connected to an interoperation controller, and the interoperation controller is configured to inform a driver of a change in state of the rear seat or the armrest on the basis of the sensor signal.

9. The armrest lighting control device of claim 8, wherein the change in state is displayed on a driver seat cluster.

10. The armrest lighting control device of claim 8, wherein the switch controller is configured to apply information as to whether an armrest angle value of the armrest is equal to or smaller than 20°±15° to an output of the lighting-on signal.

* * * * *